(12) United States Patent
Miyano

(10) Patent No.: US 9,761,012 B2
(45) Date of Patent: Sep. 12, 2017

(54) OBJECT TRACKING DEVICE, OBJECT TRACKING METHOD, AND COMPUTER-READABLE MEDIUM

(71) Applicant: NEC Corporation, Tokyo (JP)

(72) Inventor: Hiroyoshi Miyano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/793,137

(22) Filed: Jul. 7, 2015

(65) Prior Publication Data

US 2016/0012608 A1    Jan. 14, 2016

(30) Foreign Application Priority Data

Jul. 8, 2014  (JP) ................................ 2014-140582

(51) Int. Cl.
*G06K 9/00* (2006.01)
*G06T 7/215* (2017.01)

(52) U.S. Cl.
CPC .... *G06T 7/215* (2017.01); *G06T 2207/30196* (2013.01); *G06T 2207/30232* (2013.01); *G06T 2207/30236* (2013.01)

(58) Field of Classification Search
CPC ........ G06K 9/46; G06T 7/0042; G06T 7/2033
See application file for complete search history.

(56) References Cited

U.S. PATENT DOCUMENTS

| 5,960,097 | A * | 9/1999 | Pfeiffer | G06K 9/3241 |
| | | | | 342/357.59 |
| 6,812,835 | B2 * | 11/2004 | Ito | G08B 13/19604 |
| | | | | 340/541 |
| 8,150,208 | B2 * | 4/2012 | Misawa | G06K 9/00228 |
| | | | | 382/118 |
| 2007/0189585 | A1 * | 8/2007 | Sukegawa | G06K 9/00221 |
| | | | | 382/118 |
| 2007/0268369 | A1 * | 11/2007 | Amano | H04N 7/18 |
| | | | | 348/207.99 |

(Continued)

FOREIGN PATENT DOCUMENTS

JP    5058010 B2    10/2012
JP    2013-174568 A    9/2013

*Primary Examiner* — Tom Y Lu
(74) *Attorney, Agent, or Firm* — Wilmer Cutler Pickering Hale and Dorr LLP

(57) ABSTRACT

An object tracking device, method and non-transitory computer-readable storage medium are disclosed. An object tracking device may include an input terminal configured to receive an input image, and at least one processor connected to the input terminal wherein the at least one processor is configured to store a past state of a target object in a past image, detect a first object which is moving in the input image, detect a second object which is resting in the input image, estimate a current state of the target object based on the past state of the target object, wherein the current state comprises a current moving state when the target object is currently moving in the input image, and wherein the current state comprises a current resting state when the target object is currently resting in the input image, determine whether to prioritize tracking the target object with information corresponding to the first object or with information corresponding to the second object based on the current state of the target object.

19 Claims, 5 Drawing Sheets

(56) References Cited

U.S. PATENT DOCUMENTS

2011/0019027 A1\* 1/2011 Fujita ..................... G06T 7/20
348/222.1
2016/0042622 A1\* 2/2016 Takiguchi ............... G01S 17/42
348/143

\* cited by examiner

OBJECT TRACKING DEVICE, OBJECT TRACKING METHOD, AND COMPUTER-READABLE MEDIUM

CROSS-REFERENCE TO RELATED APPLICATIONS

This application claims priority from Japanese Patent Application No. 2014-140582, filed on Jul. 8, 2014, in the Japanese Patent Office (JPO), the disclosure of which is incorporated herein by reference in its entirety.

TECHNICAL FIELD

The present disclosure generally relates to an object tracking device, an object tracking method, and a computer-readable medium.

BACKGROUND ART

In recent years, techniques for tracking and detecting moving objects, such as human beings and vehicles, have been developing in the field of video monitoring. A large number of methods for detecting and tracking moving objects have been proposed.

One method for detecting a moving object includes a background subtraction method. This method compares an image captured by a camera with an image previously stored as a background and extracts an area representing a difference between two images as a moving object.

Two methods for extracting a background include a method for extracting a background by using data obtained at an observation start time and a method for extracting a background by calculating the average of observation results in a most recent certain time period. The former method for extracting a background by using data obtained at an observation start time may not keep pace with a background that varies continually. Therefore, the latter method for extracting a background by using several observation results may be typically adopted.

There also may be a method for extracting a temporarily resting object, such as an object left behind or a human being staying in a certain time period. The method may analyze motion in a scene using background models obtained over a plurality of time periods. In the method, a long-period background model, which is obtained by analyzing background images observed over a long time period, and a short-period background model, which is obtained by analyzing background images observed over a short time period, may be created. If a moving object is not detected by a background subtraction method based on the short-period background model, but a moving object is detected by a background subtraction method based on the long-period background model, the method may determine that the moving object is temporarily resting.

In other aspects, a moving object tracking method may use a Kalman filter or a particle filter. This method may assume that a target object to be tracked moves at a constant velocity or at a constant acceleration.

In another aspect, a moving object tracking device may continue tracking a moving object even if the moving object temporarily stands still at the same position where a background object exists. In other words, the moving object tracking device may track a stationary object as well as a moving object in a similar fashion and may determine whether an object being tracked is a stationary object or a moving object on the basis of the history of detection information about the object.

In a tracking method using a Kalman filter or a particle filter, it may be assumed that the motion of a tracking target is a comparatively simple motion such as constant velocity linear motion or constant acceleration motion. However, the motion of a moving object such as a human being or a vehicle may not be so simple, and there may be a case where the moving object is in a moving state or temporarily in a resting state.

For example, there may be a case where a human being and a vehicle temporarily stop at the place where there is a traffic light. Further, in the case where a moving object is a human being, if he/she is waiting for someone else, he/she may temporarily stop his/her motion. Similarly, if she/he is in a shop, he/she may temporarily stop to check out particular goods. Further, a suspicious individual may temporarily stop to watch surrounding circumstances. Further, there may be a case where a vehicle temporarily stops in a parking lot.

As described above, there may be many moving objects that repeated move and stop. In a typical tracking method, it may be assumed that the movement of a moving object is simple. Therefore, a typical tracking method may fail to detect a moving object if the moving object repeatedly moves and stops.

SUMMARY OF THE DISCLOSURE

Exemplary embodiments of the present disclosure overcome the above disadvantages and other disadvantages not described above. Also, the present exemplary embodiments are not required to overcome the disadvantages described above, and an exemplary embodiment of the present disclosure may not overcome any of the problems described above.

According to a first aspect of the present disclosure, an object tracking device is disclosed. The object tracking device may include an input terminal configured to receive an input image, and at least one processor connected to the input terminal wherein the at least one processor is configured to store a past state of a target object in a past image, detect a first object which is moving in the input image, detect a second object which is resting in the input image, estimate a current state of the target object based on the past state of the target object, wherein the current state comprises a current moving state when the target object is currently moving in the input image, and wherein the current state comprises a current resting state when the target object is currently resting in the input image, determine whether to prioritize tracking the target object with information corresponding to the first object or with information corresponding to the second object based on the current state of the target object.

According to a second aspect of the present disclosure, an object tracking method is disclosed. The object tracking method may include storing a past state of a target object in a past image, detecting a first object which is moving in the input image, detecting a second object which is resting in the input image, estimating a current state of the target object based on the past state of the target object, wherein the current state comprises a current moving state when the target object is currently moving in the input image, and wherein the current state comprises a current resting state when the target object is currently resting in the input image, determining whether to prioritize tracking the target object with information corresponding to the first object or with information corresponding to the second object based on the current state of the target object.

According to a third aspect of the present disclosure, a non-transitory computer-readable storage medium is disclosed. The non-transitory computer-readable storage medium may store instructions that when executed by a computer enable the computer to implement a method. The method may include storing a past state of a target object in a past image, detecting a first object which is moving in the input image, detecting a second object which is resting in the input image, estimating a current state of the target object based on the past state of the target object, wherein the current state comprises a current moving state when the target object is currently moving in the input image, and wherein the current state comprises a current resting state when the target object is currently resting in the input image, determining whether to prioritize tracking the target object with information corresponding to the first object or with information corresponding to the second object based on the current state of the target object.

BRIEF DESCRIPTION OF DRAWINGS

Aspects of exemplary embodiments will be more apparent by describing certain exemplary embodiments with reference to the accompanying drawings, in which.

DESCRIPTION OF EMBODIMENTS

The following description of illustrative, non-limiting embodiments discloses specific configurations, components, and processes. However, the embodiments are merely examples, and thus, the specific features described below are merely used to more easily describe such embodiments and to provide an overall understanding. Accordingly, one skilled in the art will readily recognize that the present invention is not limited to the specific embodiments described below. Furthermore, the descriptions of various configurations, components, and processes of the embodiments that would have been known to one skilled in the art are omitted for the sake of clarity and brevity.

First Exemplary Embodiment

Figure 1:
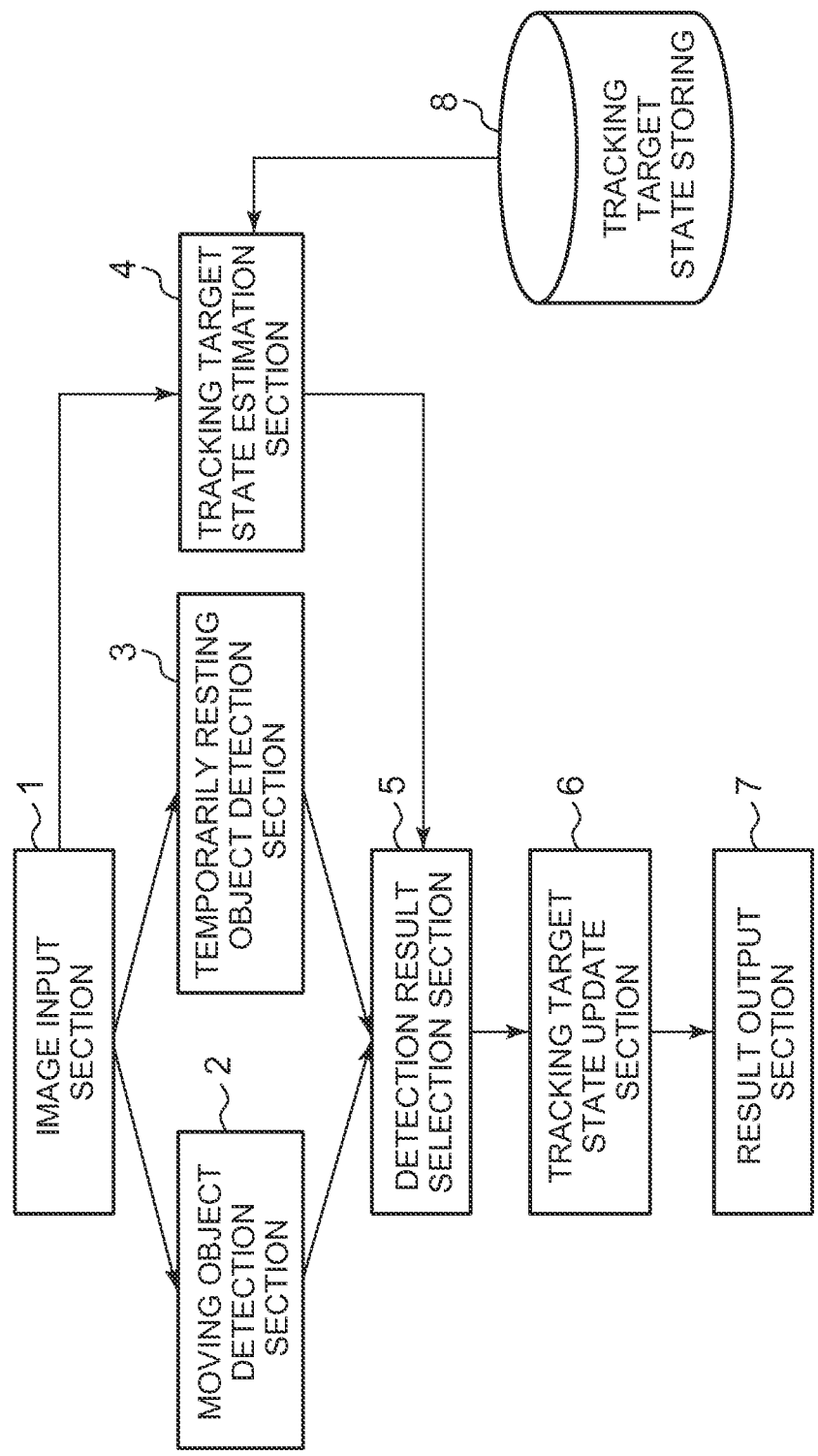
FIG. 1 is a block diagram illustrating an illustrative embodiment of an object tracking device.

FIG. 1 is a block diagram illustrating an exemplary embodiment of an object tracking device. The object tracking device may track an object in an image captured by a fixed camera or the like. As shown, the object tracking device may include an image input section 1, a moving object detection section 2, a temporarily resting object detection section 3, a tracking target state estimation section 4, a detection result selection section 5, a tracking target state update section 6, a result output section 7, and a tracking target state storing section 8.

The image input section 1 may obtain an image at a certain processing time point from a captured image. Hereinafter, an image obtained by the image input section 1 may be referred to as a target image.

The moving object detection section 2 may extract an area determined to be a moving object using the target image obtained by the image input section 1. Hereinafter, this area may be referred to as a moving object area. The moving object detection section 2 may determine whether or not each pixel in the target image is a moving object using, for example, a background subtraction method, and detect a moving object area using labelling processing.

The background subtraction method may not detect an object that rests for a time period longer than a time period for analyzing the background. In this exemplary embodiment, however, it may not be necessary for the moving object detection section 2 to detect a temporarily resting object because the temporarily resting object may be detected by the temporarily resting object detection section 3, as described in more detail below. Therefore, it may be possible to shorten a time period that the moving object detection section 2 uses for analyzing a background of an image. Furthermore, a method in which the moving object detection section 2 extracts a moving object area from a target image may not be limited to the background subtraction method. The moving object detection section 2 can use any method as long as the method can be used for extracting a moving target area.

The temporarily resting object detection section 3 may extract an area determined to be a temporarily resting object using the target image obtained by the image input section 1. Hereinafter, this area may be referred to as a resting object area. The temporarily resting object detection section 3 may determine whether or not each pixel in the target image is a temporarily resting object using, for example, a long-period resting object detection method, and detect an area determined to be a temporarily resting object using labelling processing.

The tracking target state storing section 8 may store the past states of tracking targets. In some aspects, the states of a tracking target may include not only the positions, velocities, likelihoods (weighted values) of the tracking target at past time points, but also the operation states (moving states or resting states) of the tracking target at the past time points.

For example, in the case of using a particle filter, the state of one tracking target is represented by plural particles. In some aspects, if the number of the particles is assumed to be N, the tracking target state storing section 8 may store a position $(x_i, y_i)$, a velocity $(u_i, v_i)$, and a weighted value $w_i$, all of which are information to be held by a typical particle filter. Furthermore, the section 8 may also store a variable $s_i$, which denotes whether the operation state of the i-th (i=1 to N) particle corresponds to a moving state or a resting state.

Using the past state of a tracking target stored in the tracking target state storing section 8, the tracking target state estimation section 4 may estimate the state of the tracking target at the time when the image input section 1 obtains the image. The tracking target state estimation section 4 may estimate not only the position, velocity, and weighted value of the tracking target, but also whether the operation state of the tracking target is a moving state or a resting state.

In other words, the tracking target state estimation section 4 may estimate the operation state of a tracking target at the time point when the target image is captured on the basis of the position, velocity, and operation state that represents the past state of the tracking target.

The tracking target state estimation section 4 may track an object using, for example, a Kalman filter or a particle filter. Hereinafter, the case where a particle filter is adopted by the tracking target state estimation section 4 is described below as an explanatory example. The tracking target state estimation section 4 may estimate the states of a tracking target at the time when the image input section 1 obtains images regarding all the states representing tracking states.

As is the case with the above-described example, in the case of using a particle filter, the state of one tracking target may be represented by plural particles. If the number of the particles is assumed to be N, the state of the i-th particle (i=1 to N) may be represented by a position $(x_i, y_i)$, a velocity $(u_i, v_i)$, and a weighted value $w_i$, all of which are information to be used by a typical particle filter. In addition, the state of the i-th particle may also be represented by a variable $s_i$ that represents that the operation state of the i-th (i=1 to N) particle is a moving state or a resting state.

It may be assumed that the position $(x_i, y_i)$ on a screen is represented in an x-y coordinate system with its origin lying at the upper left corner of the screen. The velocity $u_i$ may represent a velocity along the x-axis, and the velocity $v_i$ may represent a velocity along the y-axis. An elapse time from the time when the previous process is performed to the time when an image is obtained by the image input section 1 may be set to be $\Delta T$. Also, the motion of a tracking target may be assumed to be a constant velocity motion. The tracking target state estimation section 4 may update the position $(x_1, y_i)$ and the velocity $(u_i, v_i)$ of the tracking target with the following Expression 1.

$$x_i = x_i + u_i \Delta T + e_x$$

$$y_i = y_i + v_i \Delta T + e_y$$

$$u_i = u_i + e_u$$

$$v_i = v_i + e_v \quad \text{(Expression 1)}$$

In Expression 1, $e_x$ and $e_y$ may be terms representing deviations of actual motion from constant velocity motion along the x-axis and y-axis, respectively, and they may be random numbers given from a normal distribution with a predetermined standard deviation sig1. In Expression 1, $e_u$ and $e_v$ may be random numbers given from a normal distribution with a predetermined standard deviation sig2.

Two types of standard deviations (sig1, sig2) may be provided in accordance with the value of the variable $s_i$. In some aspects, one type may be standard deviations (sig1m, sig2m) that are used in the case where the variable $s_i$ represents a moving state, and the other may be standard deviations (sig1s, 0) that are used in the case where the variable $s_i$ represents a resting state. The tracking target state estimation section 4 may create random numbers $e_x$, $e_y$, $e_u$, and $e_v$ by differentially using the standard deviations in accordance with the value of the variation $s_i$.

Because the velocities are zero in any resting state, $u_i$, $v_i$, $e_u$, and $e_v$ may be all set to zero. Further, it may be generally expected that a variation in a moving state is larger than a variation in a resting state, so that there is a relation sig1m≥sig1s between the two standard deviations sig1m and sig1s regarding the position of a tracking target.

The tracking target state estimation section 4 may also estimate the operation state represented by the variable $s_i$. It may be assumed that the operation state transits from a resting state to a moving state on the basis of a predetermined probability P. It may also be assumed that the operation state transits from a moving state to a resting state on the basis of a predetermined probability Q.

In the case where $s_i$ represents a resting state, the tracking target state estimation section 4 may create a uniform random number between 0 and 1. If the created random number is P or less, the tracking target state estimation section 4 may change the value of $s_i$ to a value representing a moving state. In some instances, if the state is in resting state, $u_i=0$ and $v_i=0$. In other instances, if the state changes into the moving state, the target object starts to have a velocity, and the tracking target state estimation section 4 may set random numbers given from a normal distribution with a predetermined standard deviation sig2 to $u_i$ and $v_i$.

In the case where $s_i$ represents a moving state, the tracking target state estimation section 4 may create a uniform random number between 0 and 1. If the created random number is Q or less, the tracking target state estimation section 4 may change the value of $s_i$ to the value representing a resting state. If the state changes into the resting state, the moving velocity of the target object becomes zero, and the tracking target state estimation section 4 may set both $u_i$ and $v_i$ equal to zero.

In other aspects, the tracking target state estimation section 4 may estimate the state of the variable $s_i$ on the basis of the past history or statistical results. For example, it may be assumed that the operation state of a tracking target transited from a resting state to a moving state, and that the variable $s_i$ has a value representing the moving state. If this transition occurred recently, and the time has not exceeded a predetermined time period since this transition to the moving state occurred, it may be expected that this tracking target does not return to the resting state immediately. Therefore, in this case, the tracking target state estimation section 4 can maintain the operation state of the tracking target as the moving state as for a certain time period.

In a similar way, it may be assumed that the operation state of a tracking target transited from a resting state to a moving state, and that the variable $s_i$ has a value representing the resting state. If this transition occurred recently, and the time has not exceeded a predetermined time period since this transition to the resting state occurred, it can be expected that this tracking target does not return to the moving state immediately. Therefore, in this case, the tracking target state estimation section 4 can maintain the operation state of the tracking target as the resting state for a certain time period.

In other aspects, a situation, in which the operation state of a tracking target transits, may be changed in accordance with a location in an image. For example, in an area representing a passageway in the image, the transition probability Q from a moving state to a resting state can be set to a smaller value. In an image representing an area often used as a meeting place, the transition probability Q can be set to a larger value.

The tracking target state estimation section 4 can estimate the states of be more than one tracking target. In the case where the tracking target state estimation section 4 estimates the states of more than one tracking target, the tracking target state estimation section 4 may perform the process described above on each of the tracking targets individually.

The detection result selection section 5 may prioritize which information is used to continue tracking the tracking target. Namely, it may prioritize whether information of a moving object area extracted by the moving object detection section 2 is used or whether information of a resting object area extracted by the temporarily resting object detection section 3 is used.

For example, in the case of using a particle filter, the detection result selection section 5 may determine whether a detection result obtained by the moving object detection section 2 is used or a detection result obtained by the temporarily resting object detection section 3 is used for each particle. For example, if a particle is estimated to be in a moving state, the detection result selection section 5 may determine to use the detection result detected by the moving object detection section 2. If the particle is estimated to be in a resting state, the detection result selection section 5 may determine to use the detection result detected by the temporarily resting object detection section 3.

In some instances, the detection result selection section 5 may calculate a likelihood according to the proximity of a moving object area for each particle if the particle is estimated to be in a moving state. Similarly, the detection result selection section 5 may calculate a likelihood according to the proximity of a resting object area for each particle if the particle is estimated to be in a resting state. The detection result selection section 5 may determine to use one that brings about a larger calculated likelihood between the above two detection results. In some instances, in the case where a particle is estimated to be in a moving state, the detection result selection section 5 may calculate a likelihood according to the proximity of a resting object area by multiplying the likelihood by a predetermined number, which is between 0 and 1 (inclusive), as a penalty. In other instances, in the case where a particle is estimated to be in a resting state, the detection result selection section 5 may calculate a likelihood according to the proximity of a moving object area by multiplying the likelihood by a predetermined nonnegative number, which is between 0 and 1 (inclusive), as a penalty. As a result, unless the detection result selection section 5 obtains a detection result which is different from the estimated result and has a very high likelihood, the detection result selection section 5 may prioritize the detection result which has the same state as the estimated result, and the state of the particle may remain the same as the estimated state.

In other aspects, in the case where there are plural selectable detection results, the detection result selection section 5 may select a detection result nearest to the particle. In other aspects, the detection result selection section 5 may determine whether to prioritize information represented by a moving object area or information represented by a resting object area. In determining which information to prioritize, the section 5 may compare the distance between the position of the tracking target estimated on the basis of the operation state and the moving object area with the distance between the position of the tracking target and the resting object area. In other aspects, the detection result selection section 5 may prioritize information represented by a moving or resting object area according to the similarity between the feature included in the moving object area and the feature represented by the tracking target and similarity between the feature included in the resting object area and the feature represented by the tracking target.

There may be a case where any detection result cannot be selected. In this case, the detection result selection section 5 may determine that there is no detection result, and may continue subsequent processes.

In the case where there are plural tracking targets, the detection result selection section 5 may perform the above-described processes on each tracking target. It may also impose a restriction of whether different tracking targets should use the same detection result. The detection result selection section 5 may select respective detection results exclusively using the Hungarian method if different tracking targets should use the same detection result.

If there is a detection result that is not selected as a detection result corresponding to a tracking target, the detection result selection section 5 may determine the detection result to be a new tracking target. In this case, the tracking target state update section 6 described below may store this new tracking target in the tracking target state storing section 8.

The tracking target state update section 6 may update the state of the tracking target with the detection result selected by the detection result selection section 5. The tracking target state update section 6 may update the position information, the weighted value, and the like of the tracking target in a similar way to a typical tracking process. For example, in the case where a particle filter is used, the tracking target state update section 6 may calculate a likelihood for each of particles i (i=1, . . . N) and update the weighted value $w_i$.

The tracking target state update section 6 may set a larger $w_i$ to a particle closer to the detection result. The tracking target state update section 6 may calculate a distance between the gravity center coordinate of the detection result and a particle, and calculate a likelihood in such a way that the value becomes smaller in accordance with a normal distribution as the distance becomes larger. If the detection result selection section 5 does not select any detection result, it may not be necessary for the tracking target state update section 6 to especially perform any process.

In the case where there are plural tracking targets, the tracking target state update section 6 may perform the above-described processes on each tracking target. The tracking target state update section 6 may update the state of a tracking target stored in the tracking target state storing section 8 with the calculated state of the tracking target state. The calculated state may include the calculated position, velocity, weighted value, and operation state of the tracking target.

If there is a new tracking object, the tracking target state update section 6 may store the state of the new tracking target in the tracking target state storing section 8. In the case where a particle filter is used, the tracking target state update section 6 may randomly and newly create particles in the vicinity of the position of a detection result in accordance with a normal distribution with a predetermined standard deviation.

If a new tracking target is detected by the moving object detection section 2, the tracking target state update section 6 may determine the operation state of the tracking object to be a moving state, and set the velocity of the object to be a random number in accordance with a normal distribution with a predetermined standard deviation. If a new tracking target is detected by the temporarily resting object detection section 3, the tracking target state update section 6 may determine the operation state of the tracking object to be a resting state, and set the velocity of the object to be zero.

It is not necessary that the tracking target state update section 6 should store all new tracking targets in the tracking target state storing section 8. The tracking target state update section 6 may store, for example, only new tracking targets detected by the temporarily resting object detection section 3. In some aspects, an action of a human being who stands still and looks around may be considered to be a suspicious action. If it is desired to track a human being who takes such a suspicious action, a temporarily resting object may be tracked by storing detection results detected by the temporarily resting object detection section 3.

The result output section 7 may output the state of a tracking target. In some instances, the result output section 7 may output the position and operation state (moving state or resting state) of the tracking target. The result output section 7 may specify the position of the tracking target using a method similar a typical tracking process.

For example, in the case where a particle filter is used, the result output section 7 may calculate the weighted average of the positions of all particles using a weight for each particle. The section may then output the calculated average position or output the position of a particle whose weight is the largest.

The result output section 7 may determine whether the operation state is a moving state or a resting state using the result selected by the detection result selection section 5. For example, if a detection result detected by the moving object detection section 2 is selected, the result output section 7 may determine that the tracking target is in a moving state. On the other hand, if a detection result detected by the temporarily resting object detection section 3 is selected, the result output section 7 may determine that the tracking target is in a resting state.

In other aspects, if the sum of the weights of particles in their moving states is larger than the sum of particles in their resting states, the result output section 7 may determine that the tracking target is in a moving state. Otherwise, the result output section 7 may determine that the tracking target is in a resting state.

The result output section 7 may output the moving state or the resting state for the estimated position of the tracking target in different modes on the basis of the operation state of the tracking target. The result output section 7 may select an arbitrary mode as a distinguishable mode as long as the arbitrary mode can be recognized to be visually different from other modes in terms of operation state such as color, pattern, shape, brightness, or the like. The result output section 7 may select, for example, a figure that is different in color or shape from other figures in accordance with whether the estimated result is in a moving state or in a resting state, and it may superimpose the selected figure on the target image.

The image input section 1, the moving object detection section 2, the temporarily resting object detection section 3, the tracking target state estimation section 4, the detection result selection section 5, the tracking target state update section 6, and the result output section 7 may be realized by a CPU of a computer that is activated by a program (e.g., an object tracking program).

For example, the program may be stored in a memory of the object tracking device, the CPU may read in the program from the memory. The program cause the CPU to operate as the image input section 1, the moving object detection section 2, the temporarily resting object detection section 3, the tracking target state estimation section 4, the detection result selection section 5, the tracking target state update section 6, and the result output section 7.

In other aspects, the image input section 1, the moving object detection section 2, the temporarily resting object detection section 3, the tracking target state estimation section 4, the detection result selection section 5, the tracking target state update section 6, and the result output section 7 may be realized by one or more dedicated hardware units or by a combination of software and hardware units. The tracking target state storing section 8 may be realized, for example, by a magnetic disk or the like.

Figure 2:
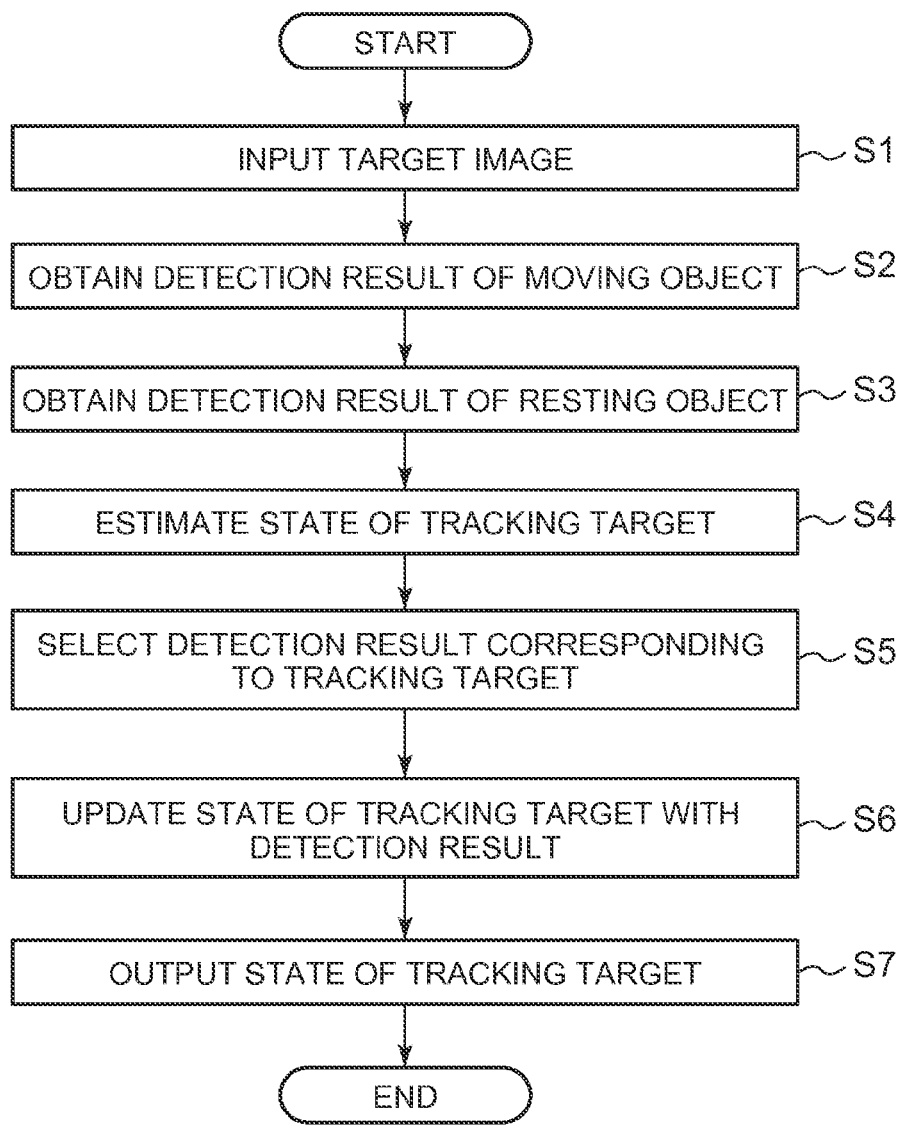
FIG. 2 is a flowchart depicting an example of the operation of the object tracking device.

An example of the operation of the illustrative embodiment of the object tracking device shown in FIG. 1 is described below. FIG. 2 is a flowchart depicting the example of the operation of the device.

As shown in FIG. 2, in Step S1, the image input section 1 may input a target image. In Step S2, the moving object detection section 2 may obtain the detection result of a moving object. For example, the moving object detection section 2 may detect a moving object area from the target image. In Step S3, the temporarily resting object detection section 3 may obtain the detection result of a temporarily resting object. For instance, the temporarily resting object detection section 3 may detect a resting object area from the target image.

In Step S4, the tracking target state estimation section 4 may estimate the state of a tracking target at the time when the image is input by the image input section 1 based on the state of the tracking target stored in the tracking target state storing section 8.

In Step S5, the detection result selection section 5 may determine which detection result corresponds to the tracking target estimated by the tracking target state estimation section 4. Namely, it may determine whether the estimated tracking target corresponds to the detection result obtained by the moving object detection section 2 or the detection result obtained by the temporarily resting object detection section 3. In other words, the detection result selection section 5 may select the detection result corresponding to the tracking target.

In Step S6, the tracking target state update section 6 may update the state of the tracking target stored in the tracking target state storing section 8 with the selected detection result. In Step S7, the result output section 7 may output the tracking result. In some instances, the result output section 7 may output the state of the tracking target.

As described above, in this exemplary embodiment, the moving object detection section 2 detects a moving object area from a target image, and the temporarily resting object detection section 3 detects a resting object area from the target image. Next, the tracking target state estimation section 4 estimates whether the operation state of a tracking target at the time point when the target image is captured is a moving state or a resting state on the basis of the past state of the tracking target. The detection result selection section 5 may determine whether to prioritize information of the moving object area or information of the resting object area for continuing to track the tracking target on the basis of the estimated operation state of the tracking target.

As described above, in this exemplary embodiment, because the state of a tracking target is also estimated, even a tracking target that moves and temporarily rests can be tracked accurately.

Second Exemplary Embodiment

An example of an object tracking device that tracks an object that temporarily rests and hangs around will be described with respect to FIGS. 3A to 3D. Namely, FIGS. 3A to 3D show images that are captured by a fixed camera, and each image represents three objects: a human being, a vehicle and a traffic light. Initially, it is assumed in this example that the tracking target state storing section 8 does not store any states of tracking objects. Further, it is assumed that a particle filter is used for tracking algorithm.

Figure 3A:
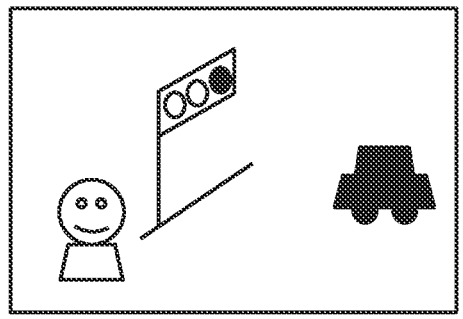
FIG. 3A is an example of a first scenario monitored by the object tracking device at a first time.

FIG. 3A shows a target image that is captured by a camera. The image represents a vehicle moving to the left, a stationary traffic light, and a human being who hangs around in the front portion of the image. The image input section 1 may input this target image, and the moving object detection section 2 may determine that the areas in the image where the vehicle and the human being exist are moving object areas. Similarly, the temporarily resting object detection section 3 may detect a temporarily resting object area from the target image. In this case, because the traffic light illustrated in FIG. 3A is stationary, an area containing the traffic light may not be extracted as a temporarily resting object area. In other words, the areas where the vehicle and the human being exist are detected as moving object areas from the target image illustrated in FIG. 3A.

The tracking target state estimation section 4 may estimate the states of tracking targets at the time when the image illustrated in FIG. 3A is captured using the past states of the tracking targets. In this case, because nothing initially is stored regarding the states of the tracking targets in the tracking target state storing section 8, no process may be especially performed regarding the tracking target state storing section 8.

The detection result selection section 5 may determine whether to use the detection result obtained by the moving object detection section 2 or the detection result obtained by the temporarily resting object detection section 3. In this case, the detection result selection section 5 may determine that two moving objects (the vehicle and the human being) that are included in the detection result obtained by the moving object detection section 2 are new tracking targets.

The tracking target state update section 6 may create new particles randomly in the vicinities of the vehicle and the human being in accordance with a normal distribution with a predetermined standard deviation. In this exemplary embodiment, because the new tracking targets are detected by the moving object detection section 2, the tracking target state update section 6 may determine the operation states of the tracking targets as moving states. Also, the section 6 may randomly set the velocities of the tracking targets in accordance with a normal distribution with a predetermined standard deviation. The tracking target state update section 6 may store the states of the new tracking targets in the tracking target state storing section 8.

The result output section 7 may superimpose information representing the moving states on the target image in FIG. 3A on the basis of the positions of the created particles.

Figure 3B:
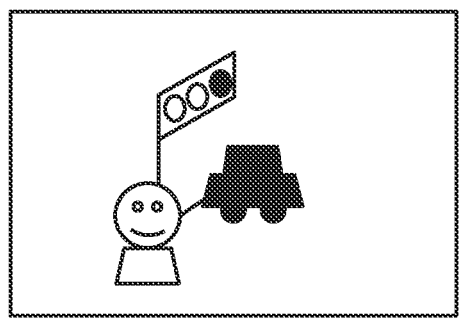
FIG. 3B is an example of a first scenario monitored by the object tracking device at a second time.

After the image in FIG. 3A is input, the object tracking device may input the target image illustrated in FIG. 3B. The target image illustrated in FIG. 3B shows the vehicle continuing to move to the left, the stationary traffic light, and the human being who continues to hang around in the front portion of the image.

The image input section 1 may input the target image illustrated in FIG. 3B, and the moving object detection section 2 may detect areas where the vehicle and the human being exist in the input target image as moving object areas. The detected moving object areas may be areas where the vehicle and the human being exist after they have respectively moved from their positions in FIG. 3A to their positions in FIG. 3B.

The tracking target state estimation section 4 may estimate the states of the tracking targets at the time when the image illustrated in FIG. 3B is captured using the past states of the tracking targets stored in the tracking target state storing section 8. For example, the past states may include the states of the tracking targets stored when the image shown in FIG. 3A was captured. In this case, because past states of the tracking targets (e.g., the vehicle and human being) are moving states, the tracking target state estimation section 4 may estimate the states of the tracking targets as moving states.

The detection result selection section 5 may determine whether to prioritize information of a moving object area (extracted by the moving object detection section 2) or information of a resting object area (extracted by the temporarily resting object detection section 3) to use for continuing to track the tracking target. In this case, assuming that any particle belonging to both tracking targets is estimated to be in a moving state, the detection result selection section 5 may determine to use the detection results detected by the moving object detection section 2 regarding both tracking targets (e.g., the vehicle and human being).

The tracking target state update section 6 may update the states of the tracking targets (position information and weighted values) with the detection results selected by the detection result selection section 5. For example, it may set the operation states to moving states.

The result output section 7 may superimpose information representing the moving states on the target image (FIG. 3B) on the basis of the updated positions of the particles.

Figure 3C:
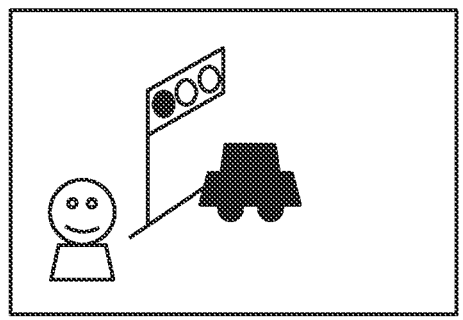
FIG. 3C is an example of a first scenario monitored by the object tracking device at a third time.

After the image in FIG. 3B is input, the object tracking device may input the target image illustrated in FIG. 3C. In the target image illustrated in FIG. 3C, the vehicle has stopped in front of the traffic light installed, and the human being continues to hangs around in the front portion of the image.

The image input section 1 may input the target image illustrated in FIG. 3C, and the moving object detection section 2 may detect an area where the human being exists in the input target image as a moving object area. Further, the temporarily resting object detection section 3 may detect an area where the vehicle exists in the input target image as a temporarily resting object area.

The tracking target state estimation section 4 may estimate the states of the tracking targets at the time when the image illustrated in FIG. 3C is captured using the past states of the tracking targets stored in the tracking target state storing section 8. For example, the tracking target state estimation section 4 may use the past states of the tracking targets stored when the image in FIG. 3B was captured. In this case, because both past states of the tracking targets are moving states, the tracking target state estimation section 4 may estimate the states of the tracking targets (e.g., the vehicle and human being) to be moving states.

The detection result selection section 5 may determine to use the detection result detected by the moving object detection section 2 regarding the human being as is the case with the target image illustrated in FIG. 3B. With respect to the vehicle, the past state of the vehicle is the moving state. However, the temporarily resting object detection section 3 may indicate that the vehicle currently is in a resting object area. Furthermore, it may indicate that the vehicle has a higher probability (likelihood) of resting, and the moving object detection section 2 may indicate that the vehicle has a lower probability (likelihood) of moving. Therefore, the detection result selection section 5 may determine to use the detection result detected by the temporarily resting object detection section 3 to indicate that the vehicle is in a resting state.

The tracking target state update section 6 may update the states of the tracking targets (position information and weighted values) with the detection results selected by the detection result selection section 5. In this case, the operation state of the vehicle may be updated from the moving state to the resting state.

The result output section 7 may superimpose information representing the moving state on the target image (FIG. 3C) on the basis of the updated positions of the particles.

Figure 3D:
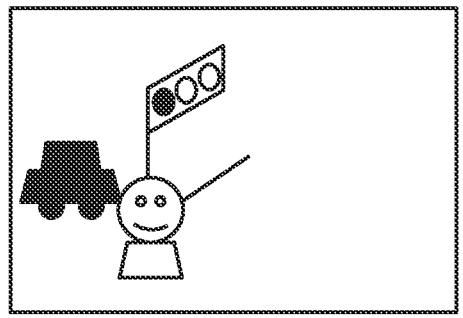
FIG. 3D is an example of a first scenario monitored by the object tracking device at a fourth time.

After the image in FIG. 3C is input, the object tracking device may input the target image illustrated in FIG. 3D. As illustrated in FIG. 3D, the traffic light has changed, and vehicle resumes moving to the left. Also, human being continues to hang around in the front portion of the image.

The image input section 1 may input the target image illustrated in FIG. 3D, and the moving object detection section 2 may detect areas where the vehicle and the human being exist as moving object areas.

The tracking target state estimation section 4 may estimate the states of the tracking targets at the time when the image illustrated in FIG. 3D is captured using the past states of the tracking targets stored in the tracking target state storing section 8. For example, the past states may include the states of the tracking targets stored when the image shown in FIG. 3C was captured. In this case, the past state of the human being is a moving state, and the past state of the vehicle is a resting state. The tracking target state estimation section 4 may estimate the current state of each tracking target at the time when the image illustrated in FIG. 3D is captured in accordance with the past state of each tracking target.

Regarding the human being, the detection result selection section 5 may determine to use the detection result (i.e., that the human being is in a moving state) detected by the moving object detection section 2 as in the case with the target image illustrated in FIG. 3C. With respect to the vehicle, although the past state of the vehicle is the resting state, the moving object detection section 2 determines that the vehicle currently is in a moving object area. Moreover, the moving object detection section 2 indicates that there is a higher probability (likelihood) that the vehicle is moving, whereas the temporarily resting object detection section 3 indicates that there is a relatively low probability (likelihood) that the vehicle currently is resting. Therefore, with respect to the vehicle, the detection result selection section 5 may determine to use the detection result (i.e., that the vehicle is in a moving state) detected by the moving object detection section 2.

The tracking target state update section 6 may update the states of the tracking targets (position information and weighted values) with the detection results selected by the detection result selection section 5. In this case, the operation state of the vehicle is updated from the resting state to the moving state.

The result output section 7 may superimpose information representing the moving states on the target image (FIG. 3D) on the basis of the updated positions of the particles.

Third Exemplary Embodiment

Figure 4A:
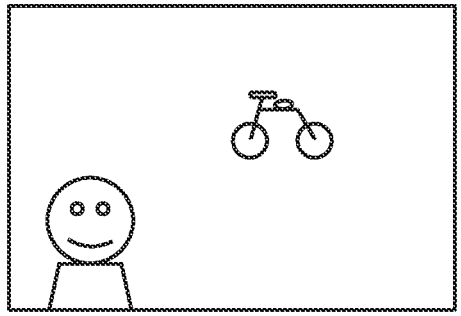
FIG. 4A is an example of a second scenario monitored by the object tracking device at a first time.
Figure 4B:
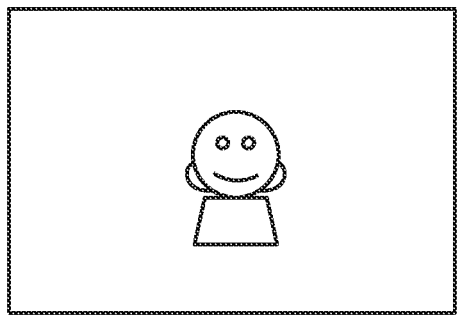
FIG. 4B is an example of a second scenario monitored by the object tracking device at a second time.
Figure 4C:
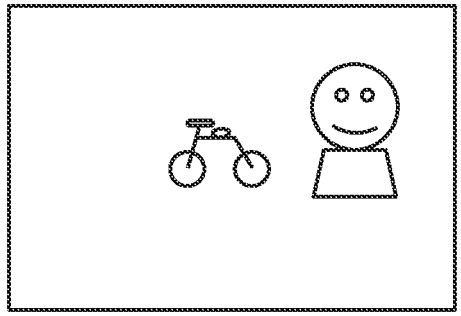
FIG. 4C is an example of a second scenario monitored by the object tracking device at a third time.

FIGS. 4A to 4C show a third exemplary embodiment of the operation of the object tracking device. In this exemplary embodiment, two tracking objects pass by each other. In this embodiment, FIG. 4A to FIG. 4C show images captured by a fixed camera, and each image includes two objects: a human being and a bicycle. Furthermore, the human being is an object that moves from the lower left portion of the image to the upper right portion of the image, and the bicycle is a temporarily resting object in the middle of the image.

The target image illustrated in FIG. 4A is captured and shows the human being moving in upward towards the right of the image and shows the bicycle as a temporarily resting object.

The image input section 1 may input the target image, and the moving object detection section 2 may detect an area where the human being exists in the input target image as a moving object area. Similarly, the temporarily resting object detection section 3 may detect an area where the bicycle exists in the input target image as a resting object area. A process in which the states of these tracking targets (e.g., the human being and the bicycle) are stored in the tracking target state storing section 8 may be similar to the process described in the second exemplary embodiment.

Next, a target image illustrated in FIG. 4B is input. The target image shows the human being moving in the diagonally upward towards the right and shows the bicycle is a temporarily resting object. Moreover, since the human being (who is a tracking target) passes in front of the bicycle, the bicycle is hidden by the human being.

The image input section 1 may input the target image, and the moving object detection section 2 may detect an area where the human being exists in the input target image as a moving object area. Because the bicycle (which is a temporarily resting object) is hidden by the human being, the temporarily resting object detection section 3 may not detect any resting object area in the input target image.

The tracking target state estimation section 4 may estimate the states of the tracking targets at the time when the image illustrated in FIG. 4B is captured by using the past states of the tracking targets stored in the tracking target state storing section 8. For example, the past states may be the states of the tracking targets (e.g., the human being and the bicycle) stored when the image shown in FIG. 4A was captured.

Since the human being is currently moving, and since the past state of the human being is a moving state, the detection result selection section 5 may determine to use the detection result detected by the moving object detection section 2. Because the detection result regarding the bicycle cannot be selected, the detection result selection section 5 may determine that there is no detection result, and subsequent processes may be continued.

The tracking target state update section 6 may update the state of the tracking target (position information and a weighted value) with the detection result selected by the detection result selection section 5. Because the detection result selection section 5 may not select any detection result regarding the bicycle, the tracking target state update section 6 may not execute any process. In other words, the state of the tracking target regarding the bicycle may not be updated this time.

The result output section 7 may superimpose information representing the moving state on the target image (FIG. 4B) on the basis of the updated positions of the particles. In this case, because nothing is detected regarding the bicycle, the state of the tracking target regarding just the human being is displayed.

Next, a target image illustrated in FIG. 4C is input. The target image shows the human being moving in diagonally upward to the right, and the bicycle that becomes visible after the human being passes by the bicycle.

The image input section 1 may input the target image and, the moving object detection section 2 may detect an area where the human being exists in the input target image as a moving object area. Similarly, the temporarily resting object detection section 3 may detect an area where the bicycle exists in the input target image as a resting object area.

The tracking target state estimation section 4 may estimate the states of the tracking targets at the time when the image illustrated in FIG. 4C is captured using the past states of the tracking targets stored in the tracking target state storing section 8. In this case, the state of the tracking target regarding the human being may be estimated using the state of the tracking target stored when the image shown in FIG. 4B was captured. Moreover, since the bicycle was hidden by the human being when the image shown in FIG. 4B was captured, the state of the tracking target regarding the bicycle may be estimated using the state of the tracking target stored when the image shown in FIG. 4A was captured.

The detection result selection section 5 may determine to use the detection result detected by the moving object detection section 2 regarding the human being, and determine to use the detection result detected by the temporarily resting object detection section 3 regarding the bicycle.

The tracking target state update section 6 may update the states of the tracking targets (position information and weighted values) with the detection results selected by the detection result selection section 5. The result output section 7 may superimpose information representing the moving state on the target image (FIG. 4C) on the basis of the updated positions of the particles.

As illustrated in FIG. 4B, there may be a case where objects that overlap each other are captured. As described above in this exemplary embodiment, even if a moving object passes in front of and hides a temporarily resting object, the operation state of the temporarily resting object may remain as a resting state. As a result, the tracking target state estimation section 4 may be able to still accurately estimate the state of a tracking target.

Figure 5:
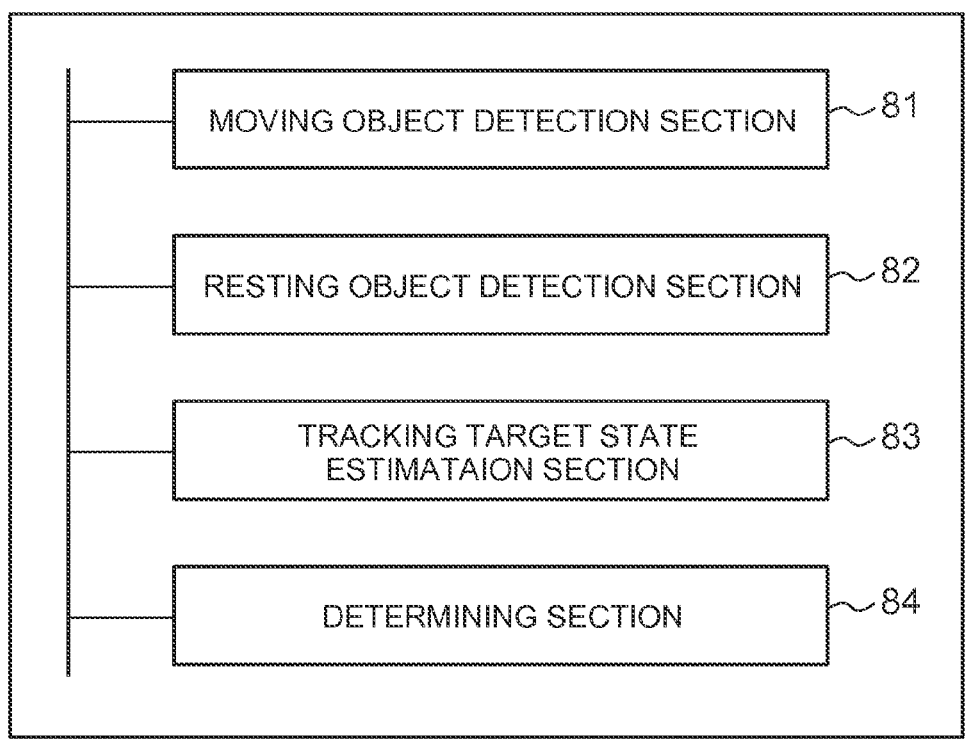
FIG. 5 is an example of a block diagram of the object tracking device.

FIG. 5 shows an illustrative, non-limiting example of a block diagram representing the object tracking device. The object tracking device may be an object tracking device for tracking an object in a captured image (for example, an object tracking device illustrated in FIG. 1), and may include a moving object detection section 81 (for example, a moving object detection section 2) for detecting a moving object area from a target image obtained from an input video picture. It may include a resting object detection section 82 (for example, a temporarily resting object detection section 3) for detecting a temporarily resting object area from the target image. It may include a tracking target state estimation section 83 (for example, a tracking target state estimation section 4) for estimating whether the operation state of a tracking target at the time point when the target image is captured is a moving state or a resting state on the basis of the past state of the tracking target (for example, on the basis of the state stored in the tracking target state storing section 8). In addition, it may include a determining section 84 (for example, a detecting result selection section 5) for determining which information is used with priority for continuing tracking the tracking target, information of the moving object area or information of the resting object area.

With the above configuration of the object tracking device, it may be possible to track a tracking target with a high degree of accuracy even if the tracking target moves and temporarily rests.

The object tracking device may further include an output section (for example, a result output section 7) for outputting a moving state or a resting state in the estimated position of the tracking target in different modes on the basis of the operation state of the tracking target (for example, the moving state or the resting state). With the above configuration of the object tracking device, it may be possible to improve the visibility of a tracking target by overlappingly displaying the result of the output section on the target image.

The tracking target state estimation section 83 may estimate the operation state of a tracking target at the time when the tracking target is captured on the basis of the position, velocity, operation state that represents the past state of the tracking target, and the likelihood of the state of the tracking target. As described above, because the operation state of a tracking target is estimated with the past operation state of the tracking target taken into consideration, the accuracy of estimating the operation state may be improved further.

The determining section 84 may determine which information is used with priority, information represented by a moving object area or information represented by a resting object area by comparing the distance between the position of the tracking target estimated on the basis of the operation state and the moving object area with the distance between the position of the tracking target and the resting object area. By performing such determining processing, priority may be given to the information represented by an area nearer to the tracking target.

In other aspects, the determining section 84 may determine which information is used with priority, information represented by a moving object area or information represented by a resting object area, in accordance with similarity between the feature included in the moving object area and the feature represented by the tracking target, and similarity between the feature included in the resting object area and the feature represented by the tracking target. By performing such determining processing, priority may be given to information of an area including a larger feature similar to the feature of the tracking target.

If the estimated operation state of a tracking target is a moving state, the determining section 84 may determine that the tracking of the tracking target should be continued using information of the moving object area, and if the estimated operation state of the tracking target is a resting state, the determining section 84 may determine that the tracking of the tracking target should be continued using information of the resting object area.

The object tracking device may include a tracking target state storing section (for example, a tracking target state storing section 8) for storing the states of tracking targets, and an update section (for example, a tracking target state update section 6) for updating the states of the tracking targets. In this case, the tracking target state estimation section may estimate the operation state of a tracking target on the basis of the past state of the tracking target stored in the tracking target state storing section, and the update section may update the state of a tracking target stored in the tracking target state storing section with the state of the tracking target calculated using information of an area determined to be prioritized by the determining section.

In this case, the update section may update the state of the tracking target stored in the tracking target state storing section with the position, velocity, operation state, and the likelihood of the state of the tracking target.

The invention claimed is:

1. An object tracking device, comprising:
an input terminal configured to receive an input image; and
at least one processor connected to the input terminal, wherein the at least one processor is configured to:

store a past state of a target object in a past image, the past state including a position, a velocity, a variable which denotes whether the target object was moving or resting when the past image was captured, and a likelihood of a current state of the target object;

detect a first object which is an object moving in the input image;

detect a second object which is an object resting in the input image;

estimate the current state of the target object based on the past state of the target object; and determine whether to prioritize the first object or to prioritize the second object before selecting the first object or the second object as the target object, based on the current state of the target object.

2. The object tracking device according to claim 1, wherein the at least one processor is further configured to:
estimate a position of the target object and an operation state that represents whether the target object is moving or resting; and
output the estimated position of the target object in different modes respectively on the basis of the operation state of the target object.

3. The object tracking device according to claim 1, wherein the at least one processor is further configured to determine whether to prioritize the first object or to prioritize the second object by comparing distance between estimated position of the target object and position of the first object and position of the second object.

4. The object tracking device according to claim 1, wherein the at least one processor is further configured to determine whether to prioritize the first object or to prioritize the second object in accordance with (1) a similarity between a first feature corresponding to the first object and a target feature corresponding to the target object and (2) a similarity between a second feature corresponding to the second object and the target feature corresponding to the target object.

5. The object tracking device according to claim 1, wherein the at least one processor is further configured to:
determine to prioritize the first object when the target object is estimated to be currently moving; and
determine to prioritize the second object when the target object is estimated to be currently resting.

6. The object tracking device according to claim 1, wherein the at least one processor is further configured to:
update the state of the target object with a state of the target object based on the first object or the second object which is prioritized.

7. The object tracking device according to claim 6, wherein the at least one processor is further configured to:
update the state of the target object with the position, velocity, the state of the target object based on the first object or the second object which is prioritized and a likelihood of the state of the target object.

8. An object tracking method comprising:
storing a past state of a target object in a past image, the past state including a position, a velocity, a variable which denotes whether the target object was moving or resting when the past image was captured, and a likelihood of a current state of the target object;
detecting a first object which is an object moving in the input image;
detecting a second object which is an object resting in the input image;
estimating the current state of the target object based on the past state of the target object; and
determining whether to prioritize the first object or the second object before selecting the first object or the second object as the target object, based on the current state of the target object.

9. The object tracking method according to claim 8, further comprising:
estimating a position of the target object and an operation state that represents whether the target object is moving or resting; and
outputting the estimated position of the target object in different modes respectively on the basis of the operation state of the target object.

10. The object tracking method according to claim 8, further comprising:
determining whether to prioritize the first object or to prioritize the second object, by comparing distance between estimated position of the target object and position of the first object and position of the second object.

11. The object tracking method according to claim 8, further comprising:
determining whether to prioritize the first object or to prioritize the second object, in accordance with similarity between a first feature corresponding to the first object and a target feature corresponding to the target object, and similarity between a second feature corresponding to the second object and the target feature represented by the target object.

12. The object tracking method according to claim 8, further comprising:
determining to prioritize the first object when the target object is estimated to be currently moving; and
determining to prioritize the second object when the target object is estimated to be currently resting.

13. The object tracking method according to claim 8, further comprising:
update the state of the target object with a state of the target object based on the first object or the second object which is prioritized.

14. A non-transitory computer-readable storage medium storing instructions that when executed by a computer enable the computer to implement a method comprising:
storing a past state of a target object in a past image, the past state including a position, a velocity, a variable which denotes whether the target object was moving or resting when the past image was captured, and a likelihood of a current state of the target object;
detecting a first object which is an object moving in the input image;
detecting a second object which is an object resting in the input image;
estimating the current state of the target object based on the past state of the target object;
determining whether to prioritize the first object or the second object before selecting the first object or the second object as the target object, based on the current state of the target object.

15. The non-transitory computer-readable storage medium according to claim 14, wherein the method further comprises:
estimating a position of the target object and an operation state that represents whether the target object is moving or resting; and
outputting the estimated position of the target object in different modes respectively on the basis of the operation state of the target object.

16. The non-transitory computer-readable storage medium according to claim 14, wherein the method further comprises:
    determining whether to prioritize the first object or to prioritize the second object, by comparing distance between estimated position of the target object and position of the first object and position of the second object.

17. The non-transitory computer-readable storage medium according to claim 14, wherein the method further comprises:
    determining whether to prioritize the first object or to prioritize the second object, in accordance with similarity between a first feature corresponding to the first object and a target feature corresponding to the target object, and similarity between a second feature corresponding to the second object and the target feature represented by the target object.

18. The non-transitory computer-readable storage medium according to claim 14, wherein the method further comprises:
    determining to prioritize the first object when the target object is estimated to be currently moving; and
    determining to prioritize the second object when the target object is estimated to be currently resting.

19. The non-transitory computer-readable storage medium according to claim 14, wherein the method further comprises:
    update the state of the target object with a state of the target object based on the first object or the second object which is prioritized.

* * * * *